United States Patent [19]

Hillery

[11] 4,195,280

[45] Mar. 25, 1980

[54] TUNED ELECTROLYTIC DETECTOR

[75] Inventor: Herbert V. Hillery, Austin, Tex.

[73] Assignee: The United States of America as represented by the Secretary of the Navy, Washington, D.C.

[21] Appl. No.: 506,391

[22] Filed: May 5, 1955

[51] Int. Cl.$^2$ .................... G01V 1/00; H04B 13/00; H04R 15/00

[52] U.S. Cl. .................................. 367/171; 367/172

[58] Field of Search ............... 340/13, 8, 8 LF, 8 PC, 340/17 R; 250/23; 179/101, 106; 310/2; 181/53

[56] References Cited

U.S. PATENT DOCUMENTS

| | | | |
|---|---|---|---|
| 2,353,920 | 7/1944 | Muzzey, Jr. | 340/13 |
| 2,615,940 | 10/1952 | Williams | 340/13 |

Primary Examiner—Theodore M. Blum
Attorney, Agent, or Firm—R. S. Sciascia; A. L. Branning

EXEMPLARY CLAIM

1. A tuned electrolytic detector cell comprising an inert plastic casing of generally cylindrical configuration, a pair of diaphragms closing the ends of said casing, an interior wall portion disposed transversely within said casing and having an opening for fluid communication therethrough, a compliant diaphragm secured to said wall portion and having an aperture centrally disposed therein, an orificed cathode box having a mass therein, attached to the central portion of said compliant diaphragm with the orifice thereof aligned with said aperture thereby to establish fluid communication therethrough, and an anode in said casing.

4 Claims, 5 Drawing Figures

TUNED ELECTROLYTIC DETECTOR

This invention relates to a tuned electrolytic detector and more particularly to a pressure sensitive electrolytic cell of a character in which increased sensitivity to pressure changes applied thereto may be obtained throughout a predetermined controlled frequency band, thereby increasing the sensitivity in the desired controlled frequency band for devices such as acoustic filters in which the tuned electrolytic detector is used.

More particularly, it is a purpose of this invention to provide a high d.c. electrical output sensitivity to acoustic pressures by mounting the cathode assembly of the detector on a flexible internal diaphragm for movement therewith. The instant diaphragm is of an inert material and disposed within the detector cell in a manner to effectively provide a separation between the two electrolyte concentrations on opposite sides thereof, and in which arrangement of structure the normal flow path is through an orifice in the mass of the cathode box.

In prior electrolytic detectors of the general character to which the instant invention is directed, such, for example, as that disclosed in the copending application for Electrolytic Signal Detector with an Orifice Cathode, Ser. No. 451,317, filed by Walter P. Christoph and assigned to the Government of the United States the cathode was disposed in, or on an inside wall of the detector with a box or the like having a small orifice therein, mounted in a manner such that it could not move relative to the detector fluid. Thus, the only relative flow between the cathode and fluid was due to the motion of the fluid itself under influences of a signal applied to the outer diaphragm structure of the detecting cell.

Since the desirability of a high sensitivity is a prime consideration in electrolytic detectors, it will become apparent as the description proceeds that the tuned detector as hereinafter described in an improvement over previous designs in that it provides a higher sensitivity for at least a narrow band of frequencies.

It is a feature of this invention to provide an electrolytic detecting cell providing a high d.c. electrical sensitivity to acoustic pressures in a controlled frequency band wherein said sensitivity is substantially higher than that obtained by electrolytic detector cells heretofore or now in general use.

One object of the instant invention is to provide a cathode assembly for an electrolytic pressure sensitive cell which is mounted as a mass on a flexible diaphragm or support of suitable compliance whereby the mass of the cathode and the compliance of the flexible support from a resonant system, the frequency of which may be controlled by changing the mass of the cathode and the compliance of the support.

It is also an object to provide a tuned electrolytic detector which is well adapted for fabrication into a compact unitary assembly with hydro-acoustic filter network components.

Another object of the instant invention resides in the provision of an electrolytic detector providing improved sensitivity and selectivity characteristics, wherein the frequency response of the detector may be peaked for a narrow band of frequencies to provide increased output therefrom in the selected band with the sensitivity over the balance of the frequency spectrum of the tuned detector of a lesser value than that of prior detector designs.

Another object of the instant invention is to provide a flexible cathode support which moves with movement of the electrolyte fluid under input signal influences and in which the flow of fluid relative to the cathode is reduced over a substantial portion of the frequency spectrum of the input signal.

In correlation with the immediately foregoing object it is a further object to provide an advantageous assembly of a cathode mass and a support therefor in a detector cell unit in which the joint function over a relatively narrow band of frequencies is such that the compliance of the cathode support is effectively tuned with the inductance of the mass, as provided by the conductance of the cathode and the cathode mass, in such a way that the cathode may be caused to move so that its displacement is out of phase with the displacement of the contained electrolyte fluid, and in which instance the flow of fluid relative to the cathode is increased thereby to allow an increased number of ions of the electrolyte solution to be in contact with the cathode for increased electric current output.

An additional object of the invention is to provide a tuned electrolytic detector which is more sensitive in its tuning range than electrolytic detecting devices heretofore in use at any frequency.

Other objects and many of the attendant advantages of this invention will be readily appreciated as the same becomes better understood by reference to the following detailed description when considered in connection with the accompanying drawings wherein.

Figure 1:
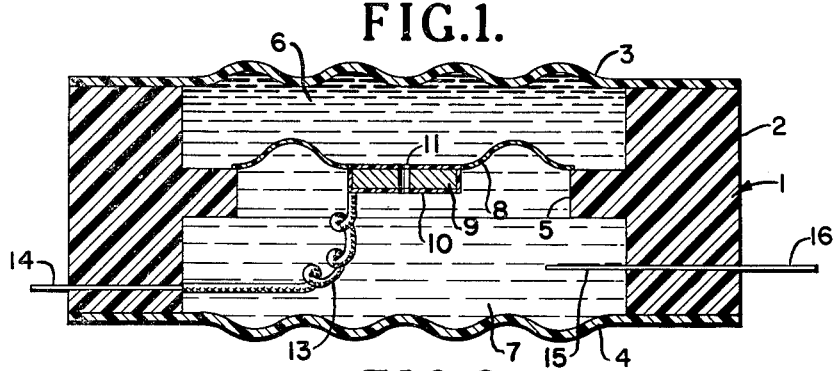
FIG. 1 is a diagrammatic view in vertical section of a detector according to a preferred embodiment of the instant invention.

Referring now to FIG. 1 of the drawings, the electrolytic detector cell according to a preferred embodiment of the instant invention is indicated generally at 1. This assembly comprises a body portion or housing 2 of generally cylindrical form and adapted to be closed at the two ends thereof by a pair of soft diaphragms 3 and 4 of negligible reactance. The housing 2 is arranged to provide a wall portion 5 at the center thereof and terminated in a stepped bore which functions with the diaphragm 8 to divide the interior into two fluid chambers generally indicated at 6 and 7. The diaphragm 8 is of suitable compliance to be tuned with the mass 9 of the cathode box structure 10 at the desired frequency. The cathode box 10 is provided with an orifice 11 which extends through both the cathode box and the mass 9 disposed on the interior thereof. The cathode may advantageously be of a material such as platinum and is connected by an insulated lead 13 to an external terminal point indicated generally at 14. The detector additionally includes a platinum anode 15 which extends into the interior of the chamber 7 and terminates in an external lead 16. The housing 2 and diaphragms 3 and 4 may advantageously be comprised of an inert plastic such as polychlorotrifluoroethylene and as manufactured by the Kellogg Co. is known in the art by the trade name Kel-F. The portion of cathode lead 13 which extends into chamber 7 is electrically insulated by a suitable waterproof material which is inert or non-reactive with respect to the solution contained therein.

Chambers 6 and 7 are filled with a solution of iodine and iodide such as potassium iodide. The electrolyte at a distance from the orifice on either side of the diaphragm 8 is at bulk concentration. If desired, two anodes 15 may be used with one on each side of cathode 1D in FIG. 1, though only one is shown. The preceeding statement is true whether one or two anodes are used. The general function of the detector is such that an acoustic signal applied to the diaphragms produces a movement of the fluid through the orifice 11 and this movement of ions through the orifice 11 causes an electrical current flow. This current flow appears correlative with the magnitude of the force in the external circuit between the anode 15 and cathode 10. The characteristics of the detector cell are such that a d.c. current is caused to flow when fluid flows in either direction, and a detection function is thus accomplished by the device. The flexible diaphragm and the mass of the cathode are so chosen or designed that the inductive, resistive and capacitive values or constants thereof when combined as the device is driven by an input signal provide oscillations or vibrations and a resonance is produced at the frequency of the desired control frequency to be detected.

An out of phase movement of the diaphragm with respect to the fluid moving through the cathode orifice occurs at the resonant frequency which tends effectively to provide an increased flow of fluid through the orifice 11 of the cathode 10 and thereby provide an increase in electrical current flow in the external circuit. At the condition of non-resonance of the supporting diaphragm 5 and cathode mass 9 a relationship results in which the cathode box 10 moves in phase with the input signal. This provides a filtering action which effectively reduces the flow of fluid through the orifice of the cathode 10 and provides a decrease in current flow in the external circuit for a given amplitude of applied acoustic signal for frequency conditions outside of the limits of the selected frequency band.

Since the output of the detector is greater at the desired frequency an effective amplification of the input signal is provided and the device is therefore more sensitive to signals of the preselected portion of the frequency spectrum of the input signal.

Figure 2:
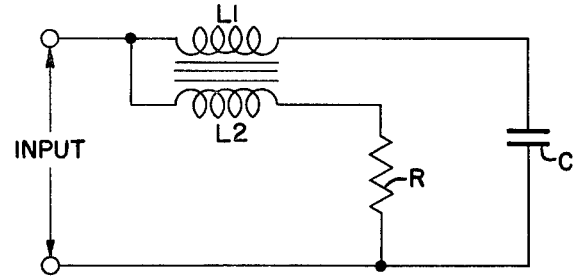
FIG. 2 is a schematic diagram of an equivalent circuit of the detector of FIG. 1.
Figure 3:
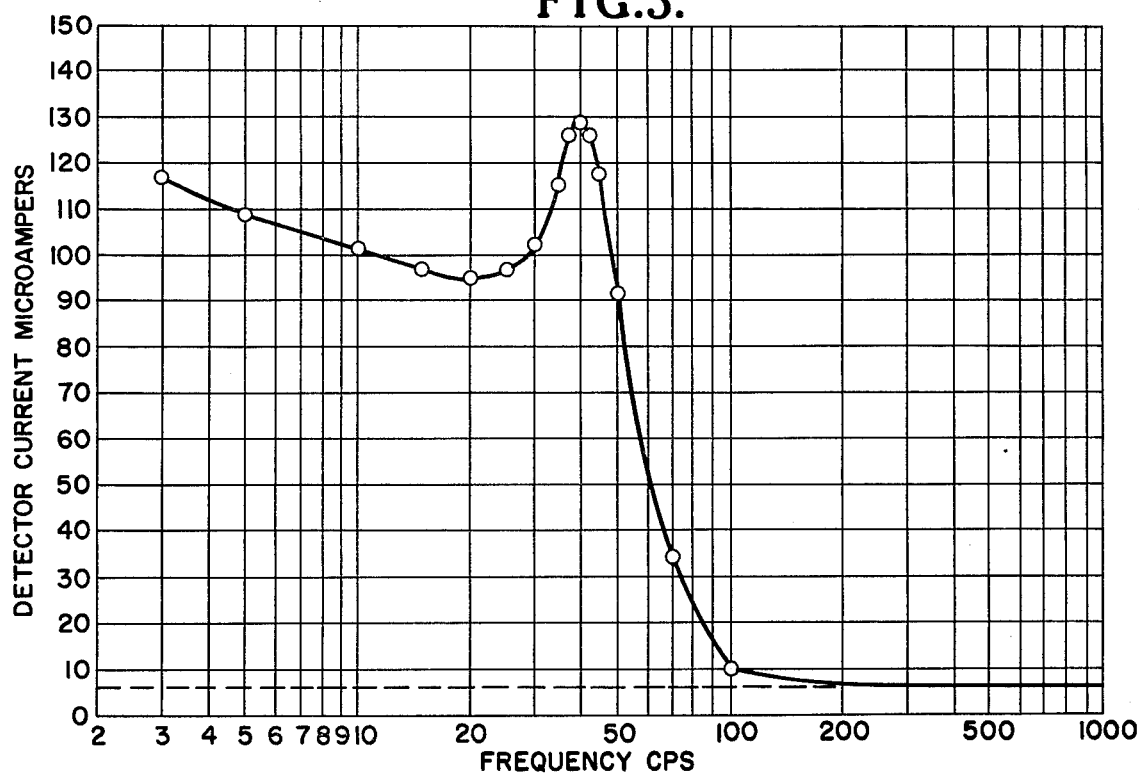
FIG. 3 is a curve showing the frequency response vs output current characteristics of a typical detector of the instant invention.
Figure 4:
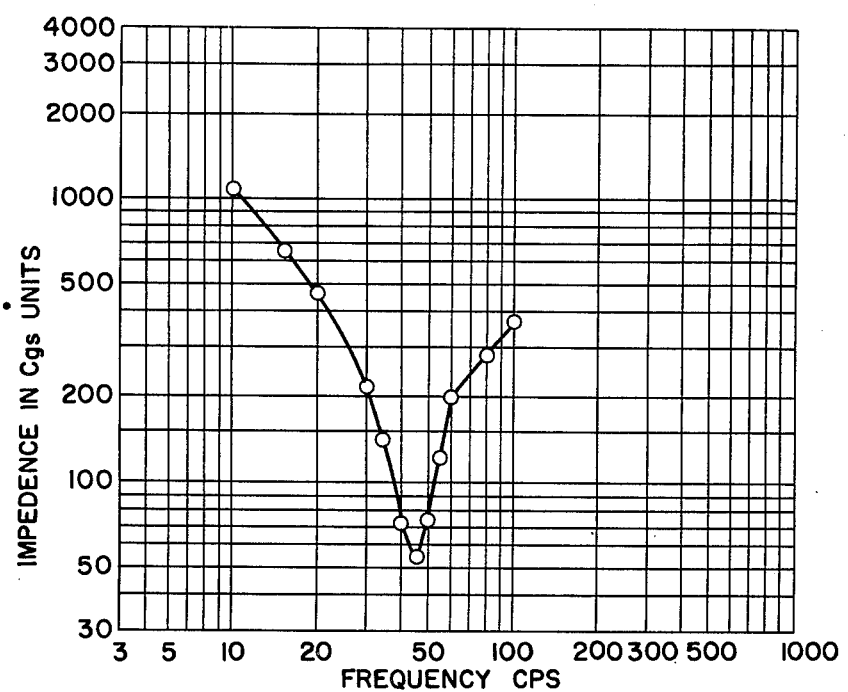
FIG. 4 is a curve showing impedance in centimeter grams second units vs frequency in cycles per second for a detector having a frequency response of FIG. 3.
Figure 5:
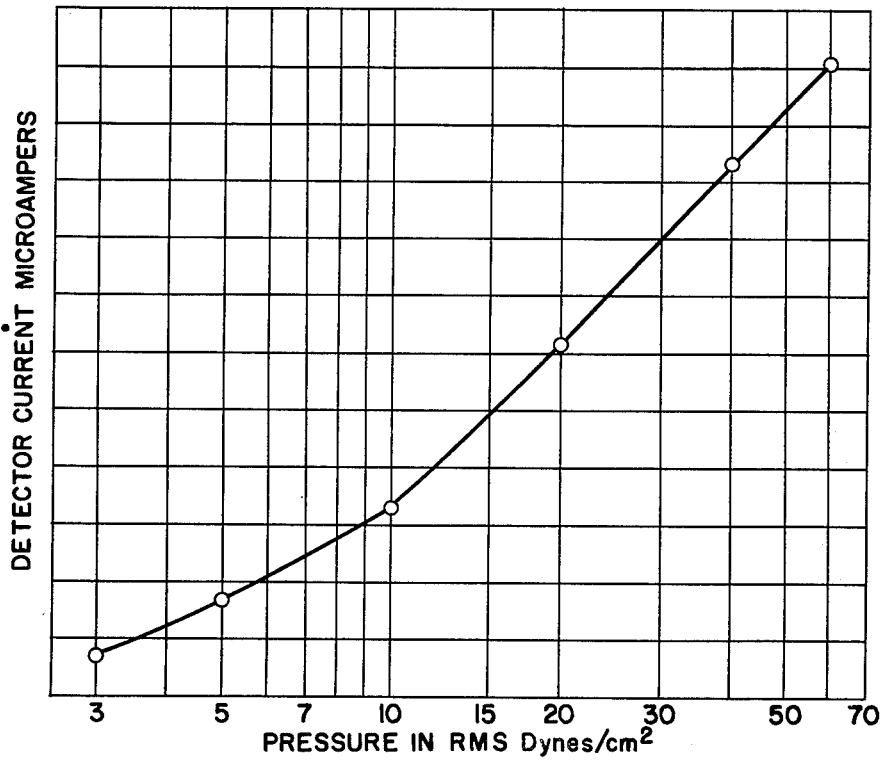
FIG. 5 is a curve showing the increase of detector current in microamperes with pressure increases in R.M.S. dynes per centimeter squared.

It will be apparent from the foregoing taken in light of the characteristic curves of FIGS. 3, 4 and 5 which are deemed to be self-explanatory that as a pressure signal of random noise frequency content is applied across the detector, fluid is forced not only through the cathode hole but also the cathode hole is caused to move with the diaphragm and relative to the fluid. It can be seen that this arrangement results in resonance in the detector response. Furthermore, it has been determined by experiment that the resonant frequency of the detector can be changed at will by varying the compliance or equivalent capacitance of the diaphragm. Referring now to FIG. 2 for the electrical analogue circuit of the device of FIG. 1, the capacitance of the diaphragm 8 is indicated at C, the inductance of the cathode support 8 at L1 and the conductance of the orifice 11 in the cathode box 10 is indicated generally at L2. The resistance of the cathode box 10 is indicated at R. It will thus be apparent from an analysis of the circuit relationship shown in FIG. 2 and from elementary circuit theory that a resonant circuit is provided. It will also be apparent from FIGS. 4 and 5 that the resonant condition displacement of the orifice in mass 9 which provides the lowest impedance to the pass band frequencies is out of phase with the displacement of the fluid flowing through it, resulting in an increased relative displacement between the fluid and the wall of the orifice and consequently provides an increased d.c. output current as shown by FIGS. 3 and 5 which are believed to be self-explanatory.

Obviously many modifications and variations of the present invention are possible in the light of the above teachings. It is therefore to be understood that within the scope of the appended claims the invention may be practiced otherwise than as specifically described, as for example, other electrolytes allowing reversible oxidation-reduction reactions such as ferricyanide-ferrocyanide, ferric-ferrous, etc., properly buffered, may be used in said detector.

What is claimed as new and desired to be secured by Letters Patent of the United States is:

1. A tuned electrolytic detector cell comprising an inert plastic casing of generally cylindrical configuration, a pair of diaphragms closing the ends of said casing, an interior wall portion disposed transversely within said casing and having an opening for fluid communication therethrough, a compliant diaphragm secured to said wall portion and having an aperture centrally disposed therein, an orificed cathode box having a mass therein, attached to the central portion of said compliant diaphragm with the orifice thereof aligned with said aperture thereby to establish fluid communication therethrough, and an anode in said casing.

2. The structure of claim 1 in which the casing and said compliant diaphragm comprise a first chamber and a second chamber, said first and second chambers being filled with an iodine-iodide solution, and said anode being disposed in at least one of said chambers.

3. A tuned electrolytic detector cell of a character providing amplification of input signals comprising, a casing, compliant means in said casing for substantially separating the interior of said casing into a pair of chambers, an iodide-iodine electrolyte solution in each of said chambers, a platinum cathode box mounted on said compliant means for movement therewith and having an orifice therethrough providing fluid communication between said chambers, an anode electrode means in at least one of said chambers, and a mass mounted on said compliant means for movement with said cathode box under pressure signal influences applied thereto.

4. The structure of claim 3 further including a pair of diaphragms of negligible inductance for closing both of said chambers of said casing.

* * * * *